(12) United States Patent
Goettfert et al.

(10) Patent No.: US 8,595,277 B2
(45) Date of Patent: Nov. 26, 2013

(54) HYBRID RANDOM NUMBER GENERATOR

(75) Inventors: Rainer Goettfert, Taufkirchen (DE);
Stefan Rueping, Lengdorf (DE); Berndt Gammel, Markt-Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 1630 days.

(21) Appl. No.: 12/030,648

(22) Filed: Feb. 13, 2008

(65) Prior Publication Data
US 2009/0204657 A1    Aug. 13, 2009

(51) Int. Cl.
*G06F 1/02*    (2006.01)
*G06F 7/58*    (2006.01)

(52) U.S. Cl.
USPC .............. 708/254; 708/250; 708/255

(58) Field of Classification Search
None
See application file for complete search history.

(56) References Cited

U.S. PATENT DOCUMENTS

| | | | |
|---|---|---|---|
| 3,790,768 A * | 2/1974 | Chevalier et al. | 708/251 |
| 7,174,355 B2 * | 2/2007 | Henry et al. | 708/250 |
| 2003/0236803 A1 | 12/2003 | Williams | |
| 2004/0019619 A1 | 1/2004 | Buer et al. | |
| 2004/0039762 A1 * | 2/2004 | Hars | 708/255 |
| 2006/0104443 A1 | 5/2006 | Chari et al. | |
| 2007/0140485 A1 * | 6/2007 | Ghigo et al. | 380/46 |
| 2007/0180009 A1 * | 8/2007 | Gutnik | 708/250 |

OTHER PUBLICATIONS

Laska J, "Random Sampling for Analog-to-INformation Conversion of Wideband Signals", Oct. 2006, Design, Applications, Integration and Software, 2006 IEEE.*
Stever Trimberger, "A Time-Multiplexed FPGA", 1997, IEEE.*
K.H Tsoi, "Compact FPGA-based True and Pseudo Random Number Generator", 2003, IEEE.*

* cited by examiner

*Primary Examiner* — Van H Nguyen
*Assistant Examiner* — Mark Gooray
(74) *Attorney, Agent, or Firm* — Schiff Hardin LLP (57) ABSTRACT

A hybrid random number generator (HRNG) including an output, a combinational logic, a TRNG, and a PRNG. The HRNG is configurable to operate in a first and a second mode, wherein in the first mode the PRNG is serially connected between the TRNG and the output and the TRNG intermittently influences the PRNG, and in the second mode the TRNG and the PRNG are connected to the output via the combinational logic.

14 Claims, 9 Drawing Sheets

HYBRID RANDOM NUMBER GENERATOR

BACKGROUND

The present invention relates to random number generation by use of a combination of a true random number generator and a pseudo random number generator.

BRIEF DESCRIPTION OF THE DRAWINGS

Embodiments of the present invention are described in the following with respect to the figures. In particular.

FIG. 3a to 3f show interconnection states of the TRNG and PRNG in accordance with a different operation modes of the hybrid random number generator of FIG. 1;

DETAILED DESCRIPTION

Figure 1:
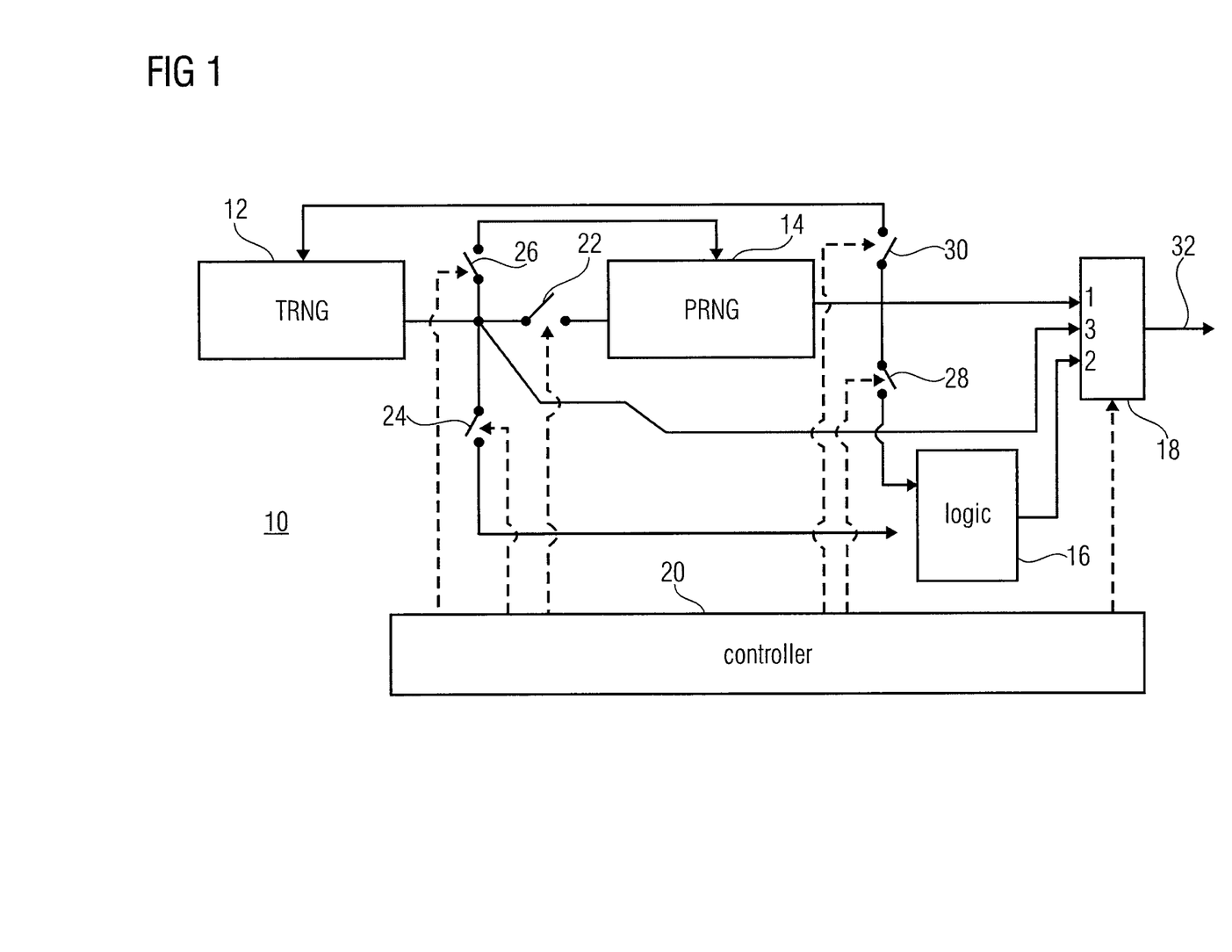
FIG. 1 shows a block diagram of a hybrid random number generator of an embodiment of the present invention.

FIG. 1 shows a hybrid random number generator 10. The hybrid random number generator 10 comprises a true random number generator 12, a pseudo random number generator 14, a combinational logic 16, a selector or selection circuit 18 and a controller 20.

The true random number generator 12 and the pseudo random number generator 14 are interconnectable in different ways. To this end, the hybrid random number generator 10 comprises switches and the selector. For example, an output of the true random number generator 12 is connectable to an input of the pseudo random number generator 14 via a switch 22. Likewise, the output of the true random number generator 12 is connectable to a first input of combinational logic 16 via a switch 24 and a decimation control input of pseudo random number generator 14 via a switch 26. An output of the pseudo random number generator 14 is connectable to a second input of combinational logic 16 via a switch 28, and to a decimation control input of true random number generator 12 via a switch 30. A first input of selection circuit 18 is connected to the output of the pseudo random number generator 14, a second input is connected to an output of combinational logic 16, and a third input thereof is connected to the output of true random number generator 12. An output of selection circuit 18 represents an output 32 of the hybrid random number generator 10. Controller 20 is coupled to switches 22 to 30 as well as a control input of selection circuit 18 in order to configure the hybrid random number generator to operate in one of several modes as it is explained in more detail below.

Figure 2A:
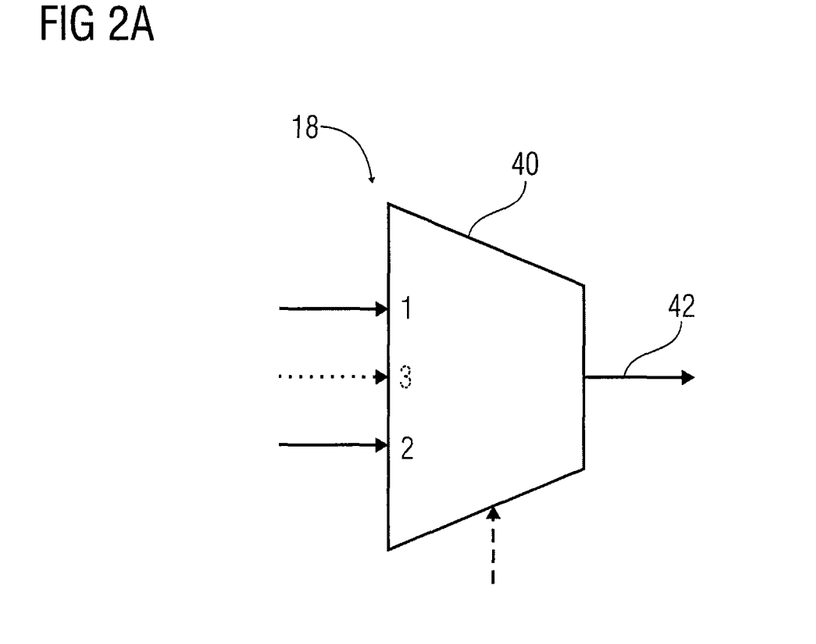
FIGS. 2a and 2b show possible implementations for the selector of FIG. 1 in accordance with embodiments.
Figure 2B:
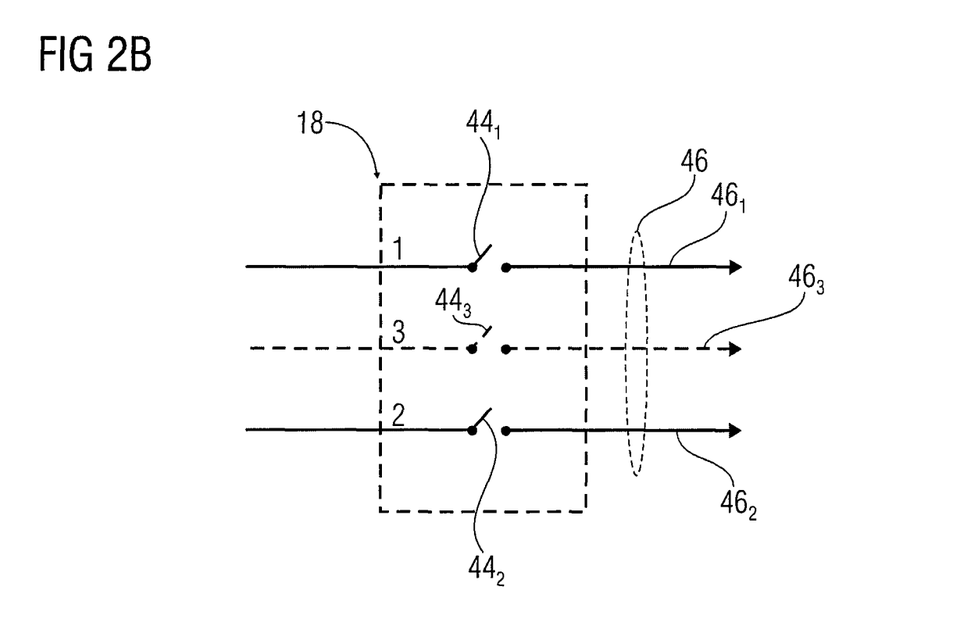

FIGS. 2a and 2b show different embodiments for the selection circuit 18. As shown in FIG. 2a, the selection circuit 18 may be implemented as a multiplexer 40 connecting one of its inputs to its outputs depending on a signal received at its control input. While in FIG. 2a the inputs are multiplexed onto a common output line 42, in the embodiment of FIG. 2b, the selection circuit comprises an own switch $44_1$, $44_2$ and $44_3$ for each of its inputs in order to connect the inputs to distinct subsets $46_1$, $46_2$ and $46_3$ of a plurality of output lines 46. Depending on the control signal at control input of selection circuit 18, one of the switches $44_1$ to $44_3$ is closed while the others are open with the one being selected depending on the control signal.

Before describing the mode of operation of the hybrid random number generator of FIG. 1, it is noted that the structure of this hybrid random number generator of FIG. 1 may be varied in a number of ways, especially as far as the positions and the existence of the switches 22 to 30 and the selection circuit 18 are concerned. Some of the switches may be left away. Further, some switches may be added with concurrently alleviating the functions which the selection circuit 18 is responsible for. Even the exemplary implementations of the selection circuit in FIGS. 2a and 2b do not cover all modifications possible. The selection circuit 18 may be a circuit that writes the random data at one of its inputs into one specific register connected to or even representing output 32.

As already noted above, the controller 20 is able to put the hybrid random number generator into one of six modes by appropriately controlling the switches 22 to 30 and selection circuit 18. These modes are described in the following with respect to FIG. 3a to 3f. As will become clear from this description, the ability of the hybrid random number generator to enable a switching between at least a subset of these six operation modes alleviates the fabrication of circuits such as cryptographic circuits, for example, which comply with various different requirements posed by different applications, standards or laws, with only a minor overhead in order for achieving this ability. To be more specific, as will be shown with respective to FIGS. 3a and 3f, the hybrid random number generator of FIG. 1 is able to operate in six different modes offering the generation of different kinds of random number signals with different properties by merely using one true random number generator and one pseudo random number generator.

Figure 3A:
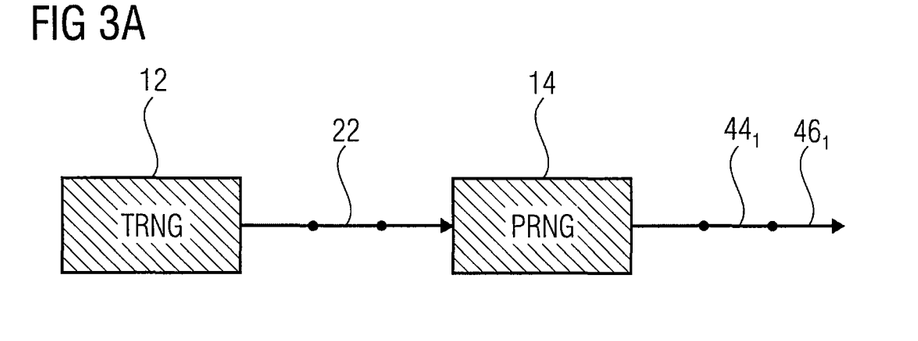
Figure 3B:
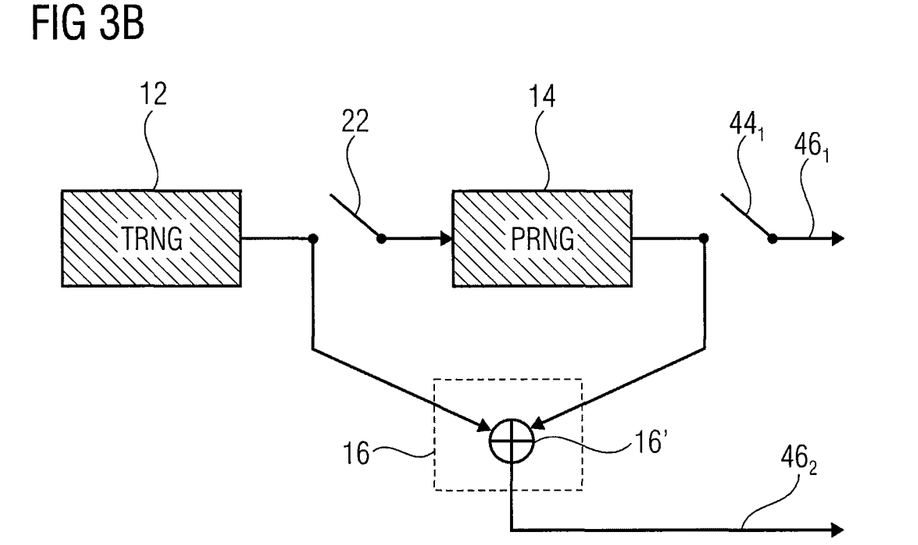
Figure 3C:
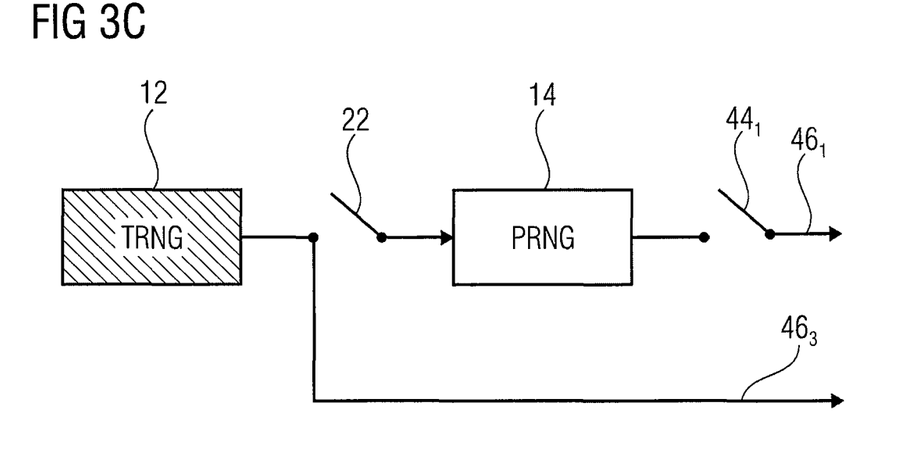
Figure 3D:
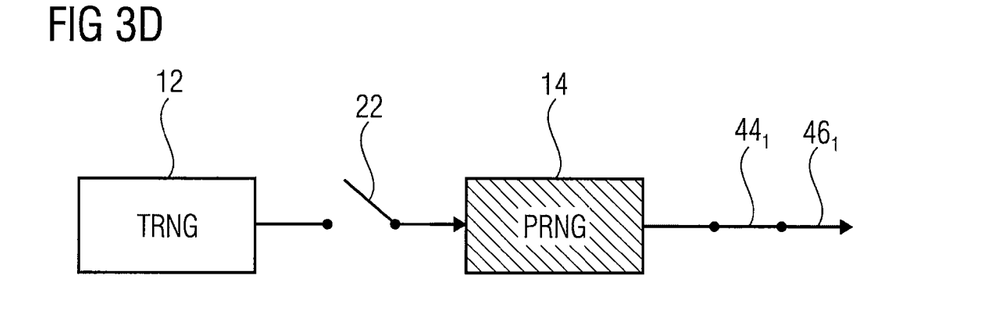
Figure 3E:
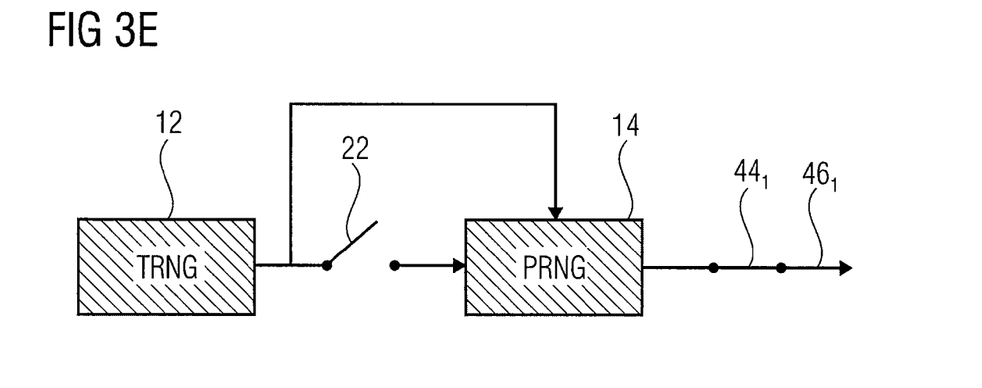
Figure 3F:
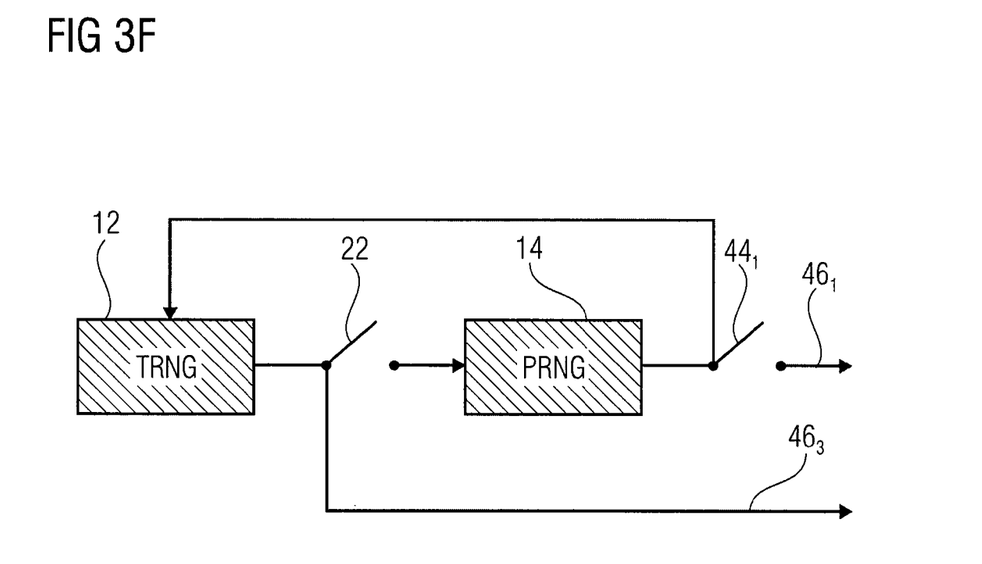

In FIGS. 3a and 3f, elements equal to those shown in the previous figures are provided with the same reference signs. In order to highlight which of the two random number generators and the pseudo random number generator participates in the respective operation mode, an inactive generator is indicated with a white box whereas an active generator is represented by a shaded box. Moreover, it is noted that FIG. 3a to 3f merely concentrate on those elements of FIG. 1 being relevant for the respective operation mode while the other part of FIG. 1 has been left away.

In order to put the hybrid random number generator of FIG. 1 into the first operation mode, controller opens switches 24, 26, 28 and 30 and instructs the selection circuit 18 to connect input 1, i.e. the output of the pseudo random number generator 14, with the output 32. Further, controller 20 intermittently closes switch 22 in order to intermittently influence the pseudo random number generator's internal state in, for example, regular intervals. Such, in accordance with this first operation mode, the hybrid random number generator uses both the true random number generator 12 as well as the pseudo random number generator 14. The true random number generator 12 influences the pseudo random number generator 14 in, for example, regular intervals, thereby intermittently seeding the pseudo random number generator 14. The intermittent influence of the pseudo random number generator's internal state may be performed by logically combining internal signals within pseudo random number generator 14 with the true random number output signal of true random number generator 12. However, it is also possible that the intermittent influence may involve a complete re-initialisation of the internal state of the pseudo random number generator 14 whereby the internal state is replaced by a new true random number bit stream received from true random number generator 12. In the latter case, the pseudo random number generator 14 is intermittently initialised with a new seed provided by true random number generator 12. The output bit sequence of the hybrid random number generator, therefore, is the output sequence of the pseudo random number generator 14 with a seed of the latter being refreshed intermittently.

To summarize, structurally, controller 20 causes the interconnection circuitry comprising the switches 22 to 30 and the selection circuit 18 in the first mode to interconnect the true random number generator 12 and the pseudo random number generator 14 such that the pseudo random number generator 14 is connected between the true random number generator 12 and output 32 with switch 22 enabling the alternating influence and free-running phases of the pseudo random number generator 14. The entropy-per-bit content of the output bit sequence of the hybrid random number generator in this first operation mode lies within 0 and 1 bits, both exclusively. The entropy-per-bit content is close to 0 in case the seed of the pseudo random number generator 14 is refreshed seldomly, and close to 1 in case the seed is refreshed frequently.

In a second operation mode, controller 20 controls switches 22 to 30 and selection circuit 18 to interconnect and combine the true random number generator 12 and the pseudo random number generator 14 in another way. In particular, in order to put the hybrid random number generator of FIG. 1 into the second operation mode, controller 20 controls switches 22 to 30 and the selection circuit 18 to connect the outputs of the true random number generator 12 and the pseudo random number generator 14 with the inputs of combinational logic 16 thereby connecting both outputs via combinational logic 16 with output 32. As an example only, the combinational logic 16 is illustrated in FIG. 3b as a module-2-adder or XOR gate. In order to achieve the above interconnectivity, controller 20 closes switches 24 and 28 and opens switches 26 and 30 and instructs the selection circuit 18 to connect the second input thereof with the output 32. Further, controller 20 may close at least once switch 22 in order to seed the pseudo random number generator 14 by means of a true random number bit sequence output by true random number generator 12.

By operating the hybrid random number generator in the way described by FIG. 3b the hybrid random number generator acts as a combined random number generator in which the true random number generator 12 and the pseudo random number generator 14 co-operate with the true random number generator 12 generating a true random sequence, the pseudo random number generator 14 generating a pseudo random sequence and operational logic 16 logically combining both bit sequences by, for example, adding modulo-2 each bit of the true random number generator bit sequence with a respective bit of the pseudo random number generator bit sequence wherein the modulo-2 addition equals an XOR operation. Instead of such a bit-wise logical combination, the bit sequences output by true random number generator 12 and pseudo random number generator 14 could also be logically combined in another way such as, for example, in blocks of several bits of each of the bit sequences.

The combined random number generator bit sequence thus obtained at the output of combinational logic 16 has the property that the entropy-per-bit content of the combined random number generator bit sequence is equal to that of the true random number generator bit sequence, i.e. close to 1 bit. Since the bit sequence output by the hybrid random number generator in case of this second operation mode, represents, for example, a bit-wise combination of both bit sequences, namely the true random bit-sequence and the pseudo random bit-sequence, the randomness strength given as, for example, the entropy-per-bit, is at least equal to that of the pseudo random number generator bit sequence. Thus, the second operation mode provides some additional failure resistance or additional security against physical manipulations of unauthorised persons.

In the first and second operation modes described above, the true random number generator 12 as well as the pseudo random number generator 14 participated in the generation of the hybrid random number generator bit stream output. However, the hybrid random number generator of FIG. 1 is also configurable to operate in operation modes in which the hybrid random number generator output bit stream merely originates from one of the true random number generator and pseudo random number generator with the other not participating or even being inactive.

For example, in a third operation mode, controller 20 controls the interconnection circuitry comprising switches 22 to 30 and selection circuit 18 such that switches 22 to 30 are open and selection circuit 18 connects input 3 with the HRNG output 32. The resulting interconnectivity or configuration of the hybrid random number generator is illustrated in FIG. 3c. As shown there, the pseudo random number generator 14 may be even inactive or shut down in this third operation mode whereas the output of the true random number generator is directly connected to the output 46$_3$ of the hybrid random number generator.

According to the fourth operation mode, in turn, controller 20 configures the hybrid random number generator such that the bit sequence output at output 32 equals the PRNG output signal. To this end, controller 20 opens all switches 22 to 30 and instructs the selection circuit 18 to connect input 1 with output 32. Merely within an initial phase, controller 20 closes switch 22 in order to seed the pseudo random number generator 14 by means of the true random number bit sequence output by TRNG 12. Thereafter, the TRNG 12 may be shut down to be inactive as illustrated in FIG. 3d.

The TRNG 12 may be configured to generate a truly random sequence of zeros and ones by exploiting a certain physical phenomenon such as a radio active decomposition, jitter of an oscillator, or thermal noise, by means of quantizing or digitizing respective analogue signals obtained from the physical phenomenon. In order to measure the degree of randomness of such a bit sequence, the entropy may be used. A random bit sequence consisting of n bits may comprise n bit entropy at maximum. In this case, the entropy may be indicated as being 100%. This maximal entropy content is achieved if the elements or symbols 0 and 1 occur at exact equal probability, i.e. at a probability of 0.5, and the individual bits are created independently of each other.

It may be that the physical noise source does not provide a bit sequence of maximal entropy. In this case, the TRNG 12 may comprise a post-processing module for performing a mathematical post-processing. This post-processing may involve a linear feedback shift register (LFSR). The post-processing may be configured such that same increases the per-bit-entropy by way of data compression. The data compression rate may be, for example, 4:1. That is, 128 random bits as obtained by the physical noise source or 128 raw bits are mapped onto 32 random bits forming the output signal of the TRNG by means of the mathematical post-processing. These 32 bits are output as the generated random bit sequence of the TRNG. The raw bits may only be internally used. By this measure, a bias of the raw bits may be compensated. For example, the digitized version of the analogue signal obtained from the physical noise source may, for example, due to technical reasons comprise too many zeros or too many ones. This bias of the distribution of zeros and ones within the raw bit data stream is compensatable by way of the post-processing. Further, the compression increases the per-bit-entropy of the random bits output by the TRNG. If, for example, the raw data has an entropy per bit of 0.8 only, i.e. 80% of the entropy of an ideal random sequence, then the mathematical post-processed random bits may have an entropy per bit value of 0.999 bit (99.9%).

The German ministry of security in information technology (BSI=Bundesamt für Sicherheit in der Informationstechnik), for example, issued AIS.31 guidelines prescribing that the random bits output by a TRNG has to show an entropy per bit value of at least 0.997 bit.

Thus, in the third operation mode, the entropy content per bit, may, in case of an appropriate TRNG, be close to 1. The TRNG may comprise a physical noise source, a digitizer for converting physical analogue signals into a bit sequence, and a post-processor for mathematically post-processing the raw data in order to compress the bit sequence.

In the fourth operation mode, the HRNG bit sequence output at output 32 equals the PRNG bit sequence. The pseudo random number generator (PRNG) may comprise an internal register for storing an internal state of, for example, some hundred bits, and circuitry for performing a mathematical algorithm and cyclically renewing the internal state. At the beginning, the pseudo random number generator is initialised by means of a so called seed. The Seed is a relatively short bit sequence which is, for example, kept secret for third parties. The seed is, thus, generated randomly. For example, the seed is generated by use of a physical random process. As noted above, the TRNG 12 itself may be used in order to seed the PRNG 14. The seed thus determines the initial internal state of the PRNG. The algorithm then generates a long bit sequence on the basis of the relatively short seed. For example, the seed may comprise 300 bits whereas the bit sequence output by the PRNG based on this seed may comprise $2^{100}$ bits. Despite this, the random bit sequence output by a PRNG may comply with statistical tests posed onto random bit sequences. Considering the entropy content per bit of such a PRNG bit sequence, it turns out that the bits output at the beginning have an entropy content per bit which is relatively high (close to 1 bit) with the entropy content per bit continuously decreasing and being close to zero after few hundred bits output. An explanation is that an attacker having excess to an infinite amount of computation power—a so called computationally unbounded adversary—and knowing the PRNG algorithm as well the first few bits of the bit sequence output, would be capable of computing all further bits of the bit sequence of the PRNG. That is, the bit sequence is pseudo random rather than truly random. Thus, as far as the fourth operation mode is concerned, the entropy content per bit of the HRNG bit sequence is, except for the first few bits, close to zero. However, the HRNG bit sequence obtained in this fourth operation mode passes most statistical tests for randomness.

Beside the above-described operation modes, the hybrid random number generator of FIG. 1 may be operated in one of two further operation modes which could be called "trigger modes" for reasons set out below. In particular, according to these further two trigger modes, the bit sequence of the HRNG is equal to a decimated version or a proper subset of the bit sequence of one of the TRNG and PRNG with the decimation or the proper subset depending on the output signal of the other of the TRNG and PRNG.

In particular, in the fifth operation mode, which is illustrated in FIG. 3e, the TRNG output bit sequence controls or triggers the output signal of the PRNG to the extent that not all of the bits generated by the PRNG are output at the HRNG's output but merely a proper subset thereof. In effect, the fifth operation mode results in an HRNG bit stream which has similar properties to that of the first operation mode. In order to put the hybrid random number generator of FIG. 1 into the fifth operation mode, controller 20 controls the interconnection circuitry comprising switches 22 to 30 and selection circuit 18 such that switch 26 is closed whereas the other switches 22, 24, 28 and 30 are open and selection circuit 18 connects input 1 with output 32. Similar to the fourth operation mode, controller 20 may temporarily close switch 22 in order to feed the pseudo random number generator once during an initialisation phase of PRNG 14. Alternatively, it would be possible to seed the PRNG 14 by some extra randomness source for providing a random seed. With the output of the TRNG 12 being connected to the decimation control input of PRNG 14, the TRNG output bit sequence determines the decimation or proper subset of an internal generated PRNG bit stream with this decimated bit stream being output at the output of PRNG 14. In other words, the PRNG 14 may be designed such that, in the absence of any signal at the decimation control input, PRNG 14 outputs the complete internal PRNG bit stream whereas otherwise, the signal at the decimation control input determines which of the bits of the complete internal PRNG bit stream are output at the output of PRNG 14 and which are not. A possible implementation for the PRNG is described in the following with respect to FIG. 4.

In the sixth operation mode, the PRNG bit stream triggers the output of the TRNG bits. That is, a non-zero subset of the TRNG bits is discarded whereas the reminder is output by TRNG 12 and represents the HRNG output bit sequence. In order to put the HRNG of FIG. 1 into the sixth operation mode illustrated in FIG. 3f, controller 20 controls the interconnection circuitry comprising the switches 22 to 30 and the selection circuit 18 such that the PRNG's output is connected the decimation control input of TRNG 12 wherein the output of PRNG 14 is disconnected from output 32 and the output of TRNG 12 is connected to output 32. To this end, controller 20 closes switch 30 and opens all remaining switches 22 to 28 and directs the selection circuit 18 to connect input 3 with output 32. The resulting interconnection is illustrated in FIG. 3f. Similar to the second, fourth and fifth operation modes, controller 20 may temporarily close switch 22 in order to seed PRNG 14.

Figure 4:
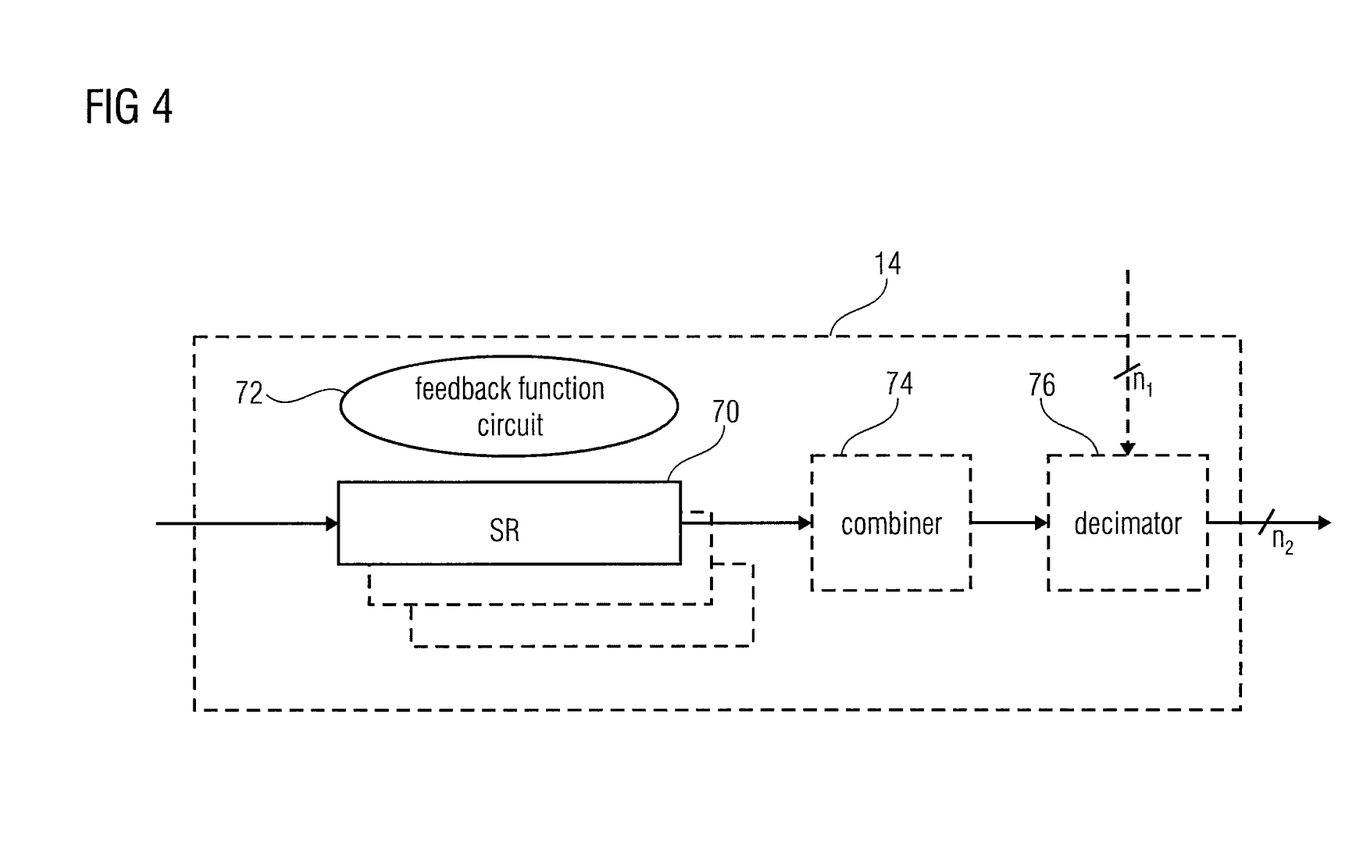
FIG. 4 shows a block diagram of a pseudo random number generator in accordance with an embodiment.

In the following, possible implementations for the PRNG and the TRNG are described with respect to FIGS. 4, 5a and 5b. FIG. 4 shows a possible implementation of the PRNG 14. As shown therein, the PRNG 14 may comprise one or more shift registers 70 connected in parallel between the input and the output of PRNG 14. In case of more than one shift register 70, same may, for example, be of different length. The content of the one or more shift registers 70 represents the internal state of the PRNG 14. The shift registers 70 are clocked by some internal clock. Further, PRNG 14 may comprise a feedback function circuit 72 which updates the internal state of the PRNG 14 between the clock cycles. Optionally, the PRNG 14 may comprise a combiner 74 connected between the one or more shift registers 70 and the output of PRGN 14. The combiner logically or mathematically combines the bits output by the last cell of each of the one or more shift registers 70.

As also indicated in FIG. 4, a decimator 76 may be connected between combiner 74 and the output of PRNG 14 or the output of the one or more shift registers 70 and the output of PRNG 14 in order to enable the above-mentioned decimation depending on the signal applied to the decimation control input. The decimator 76 may be left away in accordance with an embodiment according to which the hybrid random number generator is not configurable to operate in the fifth operation mode shown FIG. 3e. The decimator 76 may be designed to disregard certain bits of the bit sequence input into the decimator 76 with the bits being disregarded depending on the signal applied to the decimation control input of PRNG 14. As illustrated at the output side of PRNG 14, the output signal of the PRNG 14 is not restricted to a one-bit wide bit sequence. Rather, the bit sequence may generally $n_2$ bit wide with $n_2$ being an integer equal to or greater than 1.

Referring to FIGS. 3e and 4, the fifth operation mode is described again according to a more detailed embodiment. As already described, both the TRNG 12 as well as the PRNG 14 participate in generating the HRNG's output bit stream. In particular, the output bit stream of the HRNG is a proper subset of an internal PRNG bit stream, namely the bit stream entering decimator 76. The TRNG bit sequence determines which PRNG output bits are forwarded to the output of PRNG 14 and which are discarded. Assume, for example, that the TRNG 12 outputs its output bits in groups of bits such as nibble wise, i.e. in groups of four bits. Each nibble defines an integer value between 0 and 15, both inclusively. The value of the nibbles determines how much internal PRNG bits are to be discarded until the next internal PRNG bit is allowed to be output at the output of PRNG 14. For example, decimator 76 may receive the sequence of nibbles n1=0010=2; n2=0011=3; n3=0000=0; n4=0110=6; ... which have been generated by TRNG 12. Further, decimator 76 may receive the internal PRNG bit sequence from combiner 74 or the shift register 70 with this bit sequence being indicated by b1, b2, b3, b4, ..., b_n. In this case, the output sequence output by decimator 76 at the output of PRNG 14 and therefore, the HRNG output bit sequence would be b3, b7, b8, b15, ..., i.e. a strict subset of the internal PRNG bit stream entering decimator 76 with the subset depending on the true random number signal provided by TRNG 12 (see FIG. 3e). In effect, the resulting HRNG bit signal thus obtained shows similar properties as in FIG. 3a. In case of FIG. 3a, the internal state of the PRNG 14 is intermittently influenced in a truly random manner, i.e. the PRNG is intermittently seeded. Compared thereto, in case of FIG. 3e, the output function of the PRNG 14 is truly randomly influenced. Therefore, in both cases the entropy content per bit of the output bit sequence increases.

Figure 5A:
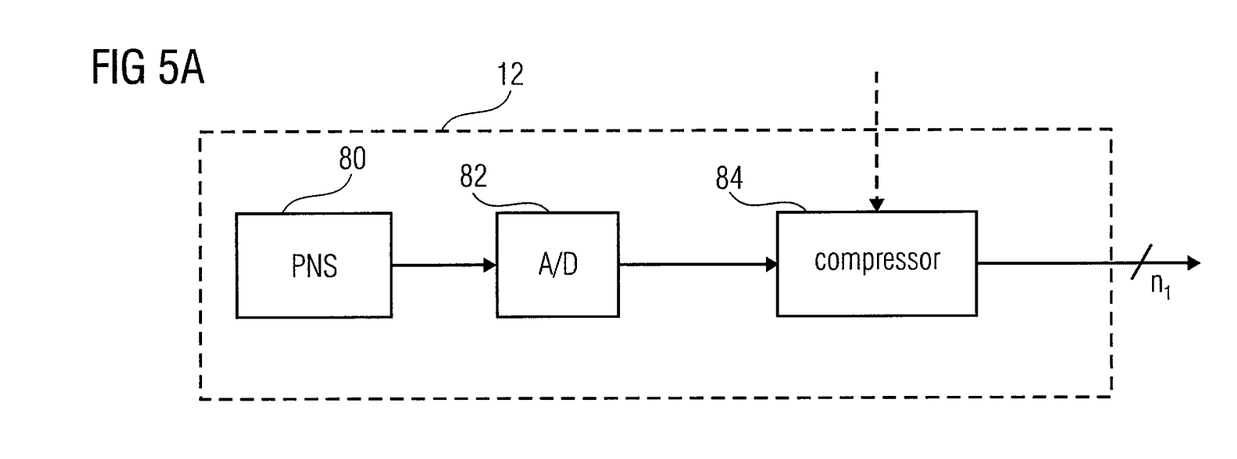
FIGS. 5a and 5b show block diagrams of a true random number generator in accordance with different embodiments.
Figure 5B:
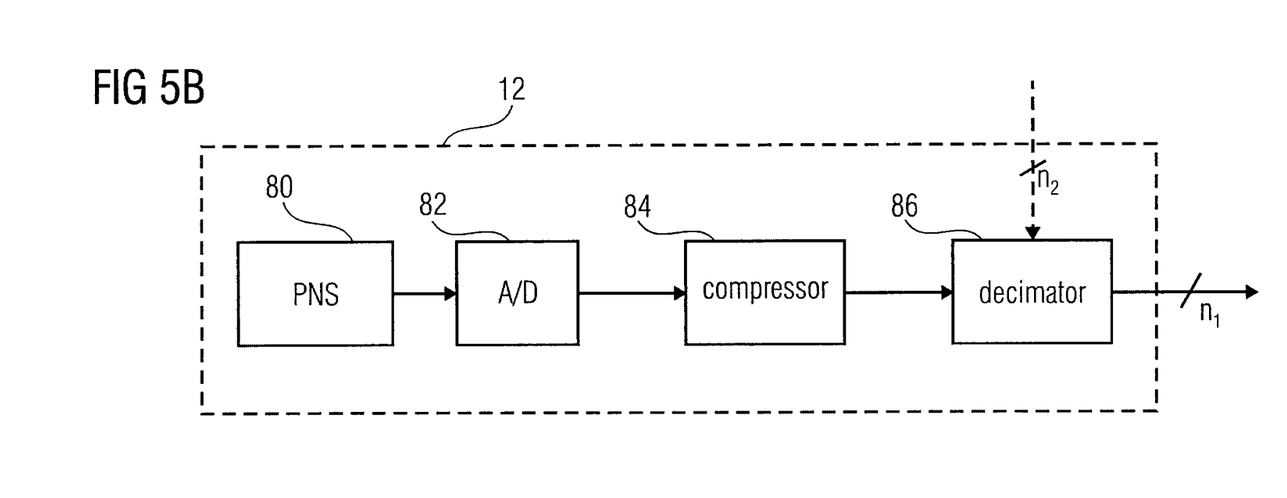

A possible implementation of the TRNG is shown in FIGS. 5a and 5b. As shown therein, the TRNG 12 may comprise a series connection of a physical noise source, a digitizer 82 and a compressor 84, with the compressor 84 compressing a bit stream generated by the digitizer 82 from an analogue signal derived from the physical noise source 80. The physical noise source 80 may, for example, comprise an oscillator connected, along with digitizer 82, into a phase locked loop with the digitizer 82 comprising, for example, a comparator or a sample latch. The compressor 84 compresses the bit stream output by digitizer 82 in that the input data rate of the compressor 84 is higher than the output rate thereof. Compressor 84 may, internally, be based on a feedback shift register. Differing from the feedback shift register which the PRNG 14 of FIG. 4 is based on, the input rate is higher than the output rate in case of compressor 84 whereas in the embodiment presented above, the output rate of the FSR 70 and 72 of FIG. 4 is higher than the input rate thereof.

Similar to FIG. 4, FIGS. 5a and 5b also refer to the possibility that the TRNG 12 is triggerable or controllable by an externally provided decimation control signal. In case of FIG. 5a, the compressor 84 is controllable by means of the decimation control signal applied to the decimation control input of TRNG 12 so that the compression ratio of the compressor 84 depends on the decimation control signal. In case of FIG. 5b, a decimator 86 is additionally connected in series between the output of TRNG 12 and compressor 84 in order to decimate the bit-stream output by compressor 84 depending on the decimation control signal received from the decimation control input of TRNG 12. Decimator 86 could, for example, operate similarly to decimator 76 of FIG. 4. For example, the $n_2$-bit decimation control signal could define bits or groups of bits to be skipped within the bit stream output by compressor 84. The compressor 84 may output a 1-bit data stream or, more generally, a $n_1$ data bit stream.

With using the implementations of the TRNG shown in FIGS. 5a and 5b and the operation mode of FIG. 3f, both the TRNG 12 and the PRNG 14 participate in forming the HRNG bit sequence. The situation is similar to that of FIG. 3e with the roles of TRNG and PRNG being interchanged. That is, the output bit sequence of the HRNG in the operation mode of FIG. 3f is, as explained above, a proper subset of the TRNG bit sequence. Since the output bit sequence in the mode of FIG. 3f is a proper subset of a true random number bit sequence, the HRNG bit sequence of FIG. 3f has the maximum entropy as well. The data rate of the output sequence of mode 3f is reduced compared to operation mode of FIG. 3c. However, the operation mode of FIG. 3f has advantages over that of FIG. 3c in the following instance. Imagine, for example, that only one TRNG 12 is present. Imagine further that the TRNG does not operate permanently but merely on demand, and that a latch register is provided in order to make a current TRNG word accessible. In this register, random bits generated by the TRNG are stored and are available until these random bits are fetched by a consumer such as an application running on a processor which is, for example, commonly integrated onto one chip along with a HRNG. Upon fetching bits from the register, the TRNG may be instructed to generate further random bits in order to refill the register. In this case, it may happen that the random bits reside within the register for a relatively long time and are therefore, for this relatively long time, susceptible to manipulation of an attacker. An attacker could, for example, override the stored bits within the register completely or partially in order to influence the operation of the consumer using or fetching random bits from the register. However, by triggering the TRNG in pseudo random time intervals by the PRNG to refill the register, the just-described attack is foiled or at least made more difficult since the attacker does not know the PRNG bit sequence and thus does not know when the register is updated by the TRNG.

Especially with respect to FIG. 1 it is noted that the above embodiments could be varied in various ways with, despite the variations, providing the same or similar effects. For example, according to a further embodiment, the HRNG of FIG. 1 could be simplified in order to enable the switching between merely two or more of the above operation modes. For example, according to an embodiment, the HRNG comprises the TRNG 12, the PRNG 14, the logic 16, an interconnection circuitry and a respective controller configured such that the HRNG is configurable to be operated in one of the operation modes shown in FIGS. 3a and 3b. According to an even further embodiment, the HRNG is configured to operate in operation modes of FIGS. 3b and 3e. These embodiments are shown in FIGS. 6 and 7.

Figure 6:
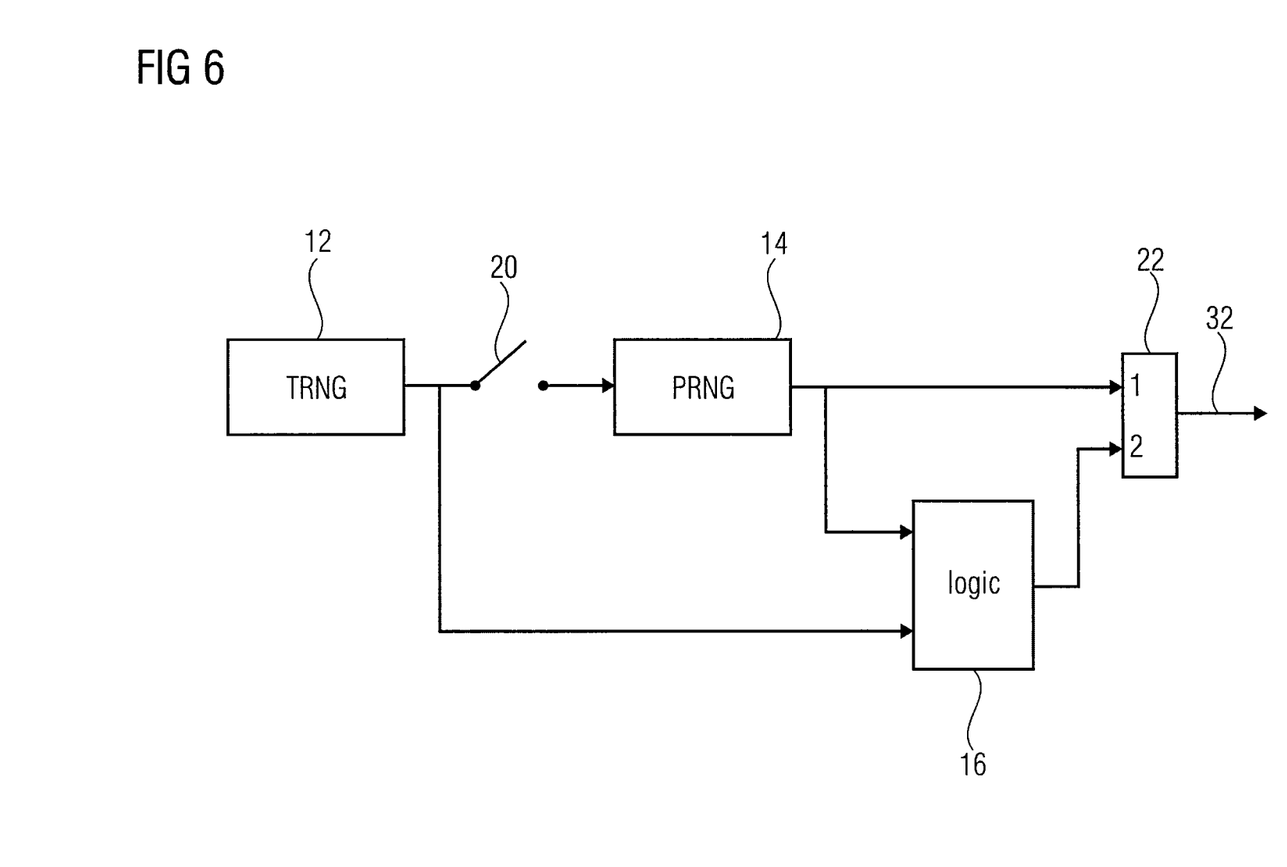
FIG. 6 shows a block diagram of a hybrid random number generator of a further embodiment of the present invention.

FIG. 6 shows an HRNG comprising the TRNG 12, the PRNG 14, combinational logic 16 and an interconnection circuitry comprising a switch 90 and a selection circuit 92. Switch 90 is connected between TRNG 12 and PRNG 14. The outputs of the TRNG 12 and the PRNG 14 are connected to respective inputs of combinational logic 16, and the outputs of the PRNG 14 and the combinational logic 16 are connected to different inputs of selection circuits 92 the output of which forms the output 32 of HRNG of FIG. 6. Switch 90 and selection circuit 92 are controlled by a respective controller which is not shown in FIG. 6 for the sake of simplification of FIG. 6. By appropriately controlling the selection circuit 92 to either connect the output of PRNG 14 to the output 32 or connect the output of logic 16 to output 32, it is possible to configure the HRNG of FIG. 6 such to operate according to the mode shown in FIG. 3a or the mode shown in FIG. 3b wherein switch 90 corresponds to switch 22.

Figure 7:
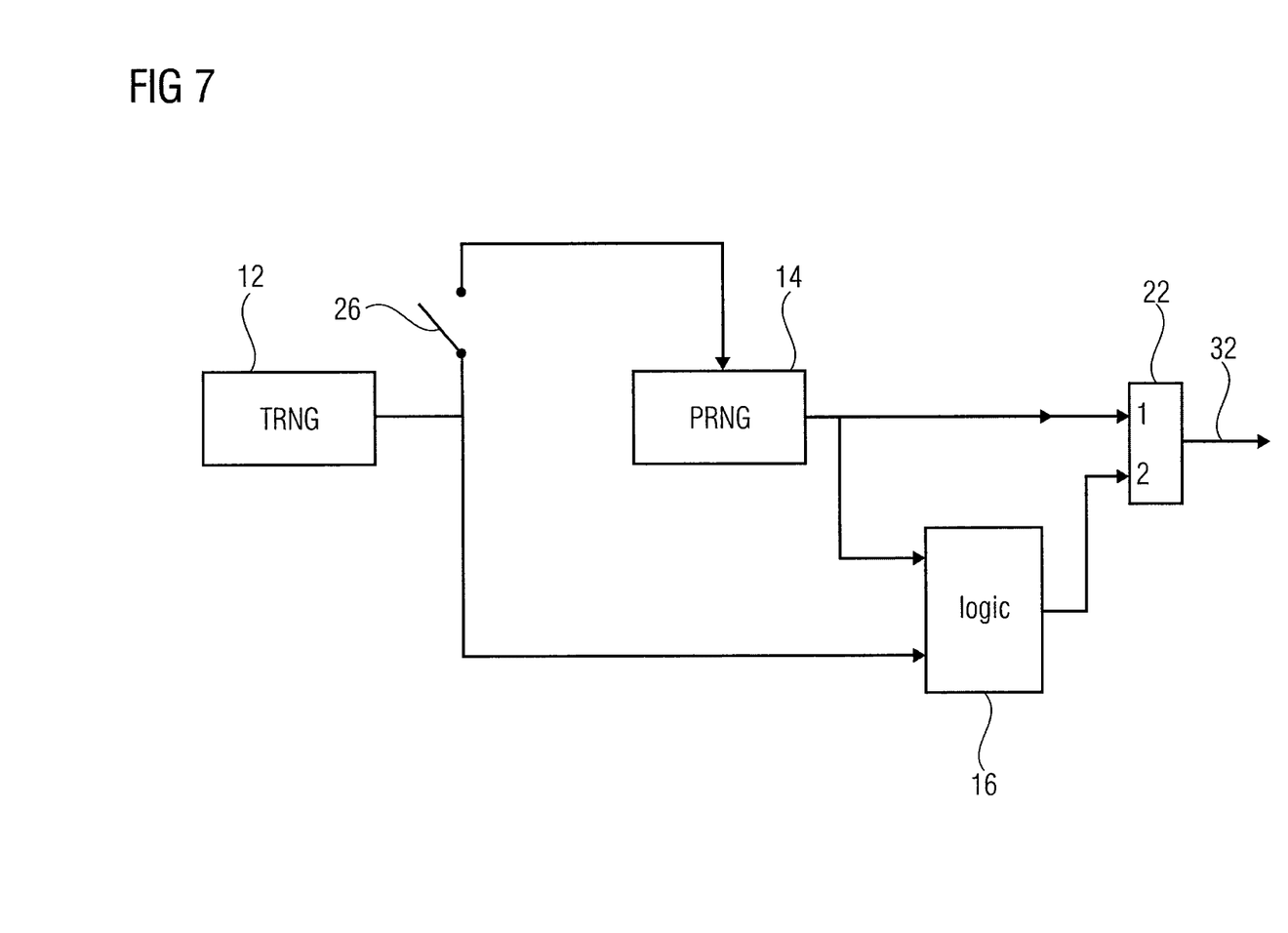
FIG. 7 shows a block diagram of a hybrid random number generator in accordance with an even further embodiment.

FIG. 7 shows an HRNG comprising the TRNG 12, the PRNG 14, the combinational logic 16 and an interconnection circuitry comprising the switch 26 as well as the selection circuit 92. Switch 22 is connected between the decimation control input of PRNG 14 and the output of TRNG 12. The outputs of TRNG 12 and PRNG 14 are connected to different inputs of combinational logical 16, and the outputs of PRNG 14 and the combinational logic 16 are connected to different inputs of selection circuit 92 the output of which concurrently forms the output 32 of HRNG of FIG. 7. Again, the controller controlling switch 22 and selection circuit 92 is not shown. By connecting the output of PRNG 14 to the output 32 it is possible to configure the HRNG of FIG. 7 such that same operates according to the mode as shown in FIG. 3e, and by connecting the output of the combinational logic 16 to the output 32 it is possible to configure the HRNG of FIG. 7 such that same operates according to the mode as shown in FIG. 3b with, in the first case, switch 26 being closed and, in the second case, switch 26 being open.

Although the HRNG of FIGS. 6 and 7 do not enable a selection among as much operation modes as the HRNG of FIG. 1 does, the HRNG of FIGS. 6 and 7 do also comprise a TRNG and PRNG which are implemented as self-contained modules such that each module is individually operative and the TRNG and PRNG are combinable with each other in two distinct ways, namely in the sense of FIG. 3b on the one hand and in the sense of FIG. 3e or 3a on the one hand. However, the provision of a possibility to switch among these modes enables to fulfil the most of the security requirements when using the HRNG in a crypto controller, a chip card, a smart card or the like. For example, as certification authorities or standardization committees see it, up until recently a TRNG was considered the random number generator which offers the highest level of security. In particular, the German BSI [Federal Agency for Security in Information Technology] was in agreement with this. However, standardization committees have recently tended to attribute a higher level of security in the field of practical utilization to an HRNG which operates in accordance with FIG. 3a (provided that the PRNG within the HRNG operating in accordance with FIG. 3a is regarded as "cryptographically strong"). [What is meant by "cryptographically strong" is that it is impossible or too time-consuming—in terms of the computing expenditure required—to calculate the seed value from the output sequence of the autonomously operated PRNG.] In particular, the French Direction centrale de la sécurité des systèmes d'information (DCSSI) absolutely recommends an HRNG operating in accordance with FIG. 3a for generating security-relevant random numbers. Previously, the American ANSI had already recommended an HRNG operating in accordance with FIG. 3a for such applications. The German BSI follows this trend in that it includes HRNGs operating in accordance with FIG. 3a in its certification catalogue as of 2008.

However, despite the official recommendation and acceptance of HRNGs, it may be stated that a KRNG (combined random number generator) which operates in accordance with FIG. 3b represents the better solution from a mathematical point of view. The KRNG operating in accordance with FIG. 3b combines the advantage of a TRNG, which consists in generating a bit sequence with maximum entropy, with the advantage of an HRNG of FIG. 3a, which consists in performing cryptographically strong post-processing of the random bits. The following table once again summarizes the properties of the different RNG modes of FIGS. 3a-3f:

|  | Entropy per bit | Cryptographically strong |
| --- | --- | --- |
| TRNG | 1 | no |
| PRNG | 0 | yes |
| HRNG | $0 < e < 1$ | yes |
| KRNG | 1 | yes |

The multi-RNG of FIG. 1 may even generate the following different random sequences, as has been described above:
a) TRNG sequence (FIG. 3c)
b) PRNG sequence (FIG. 3d)
c) HRNG sequence (FIG. 3a)
d) KRNG sequence (FIG. 3b)

Even though the KRNG sequence offers the highest level of security—from a theoretical point of view (entropy=1) and from a practical point of view (cryptographically strong)—it is, nevertheless, advantageous that there is the possibility of generating an HRNG sequence, since the HRNG operating in accordance with FIG. 3a is that variant which is (currently) required by the certification authorities.

Besides these modes, the multi-RNG described with respect to FIG. 1 is operable in the above-explained trigger modes illustrated in FIGS. 3e and 3f.

Thus, in other words, the HRNG of FIG. 1 comprises a TRNG and PRNG and comprises a control logic such that this HRNG is operable in mode of FIG. 3a and the mode of FIG. 3b. Further, the HRNG is operable in a pure TRNG mode as depicted in FIG. 3c and a pure PRNG mode as depicted in FIG. 3d due to the fact that both elements, i.e. the TRNG and the PRNG, are implemented as self-contained modules. Even further, each module, i.e. the TRNG and PRNG, is connectable to the other module such that one module is able to trigger the output of the other module.

Figure 8:
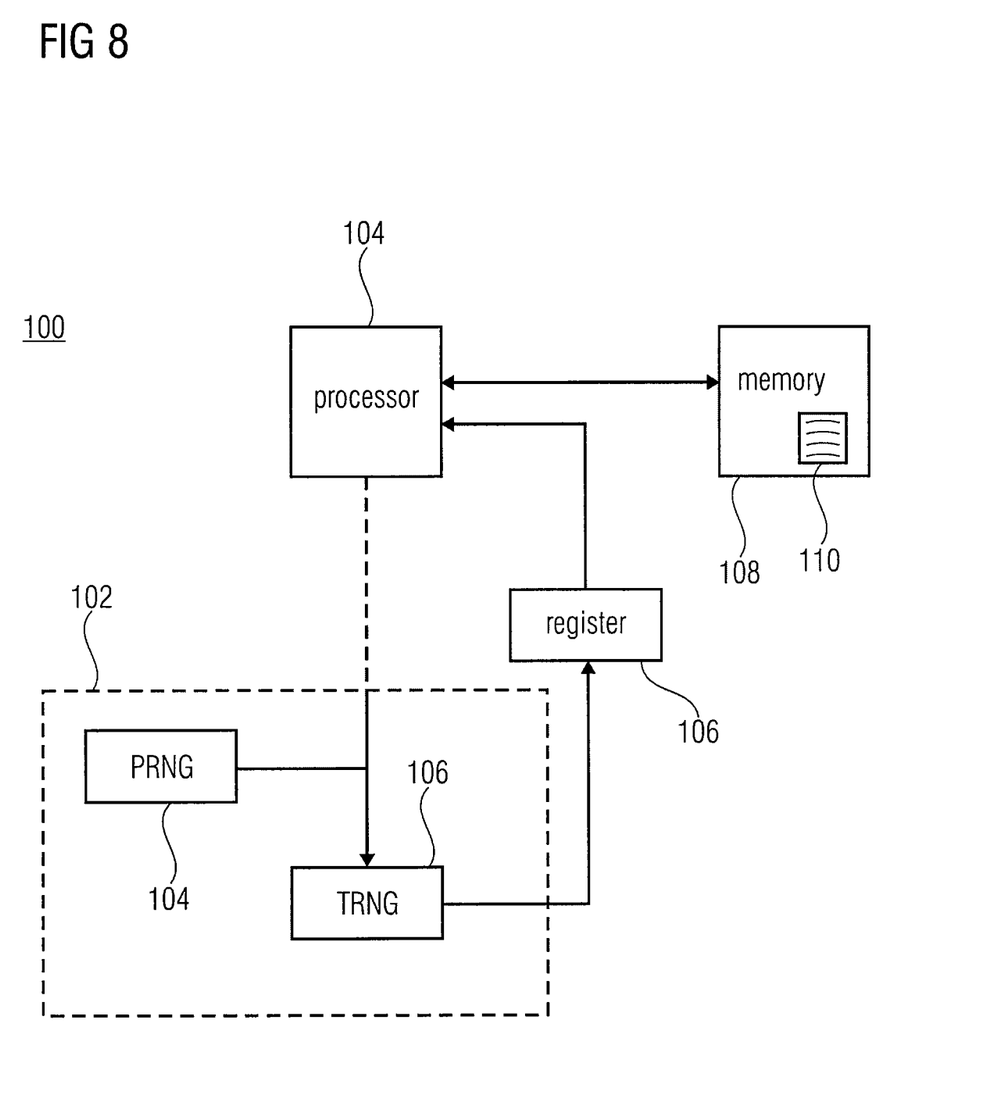
FIG. 8 shows a block diagram of a circuit comprising a hybrid random number generator in accordance with an embodiment.

As described above, the ability to switch between the different modes enables to comply with various requirements and standards with just a moderate overhead. Considering the trigger mode of FIG. 3f individually, the truly randomly triggering while decimating a TRNG output bit stream provides for an increase in security against manipulation attacks seeking to explore a secret hided by means of the truly randomly decimated TRNG bit stream. In other words, an HRNG being able to operate in the mode of FIG. 3f is able to enhance the security of a cryptographic controller comprising the same. FIG. 8 shows such a crypto controller 100 comprising an HRNG 102, a processor 104, a register 106 and a memory 108 with the HRNG 102 being able to operate in the mode of FIG. 3f. The HRNG 102 comprises a PRNG 104 and a TRNG 106 and could comply with any of the above-described HRNG's enabling a switching between operation modes comprising, inter alia, the mode of FIG. 3f. Alternatively, the HRNG 102 may be configured to operate merely in the mode according to FIG. 3f with the above-mentioned interconnection circuitry and associated controller being missing. Even alternatively, the HRNG 102 could be able to operate in a different subset of operational modes among those depicted in FIG. 3a to 3f than those used in FIGS. 6 and 7 provided the subset comprises the mode of FIG. 3f.

The processor 104 may be connected to the HRNG 102 in order to be able to deterministically trigger the output of the TRNG 106. Register 106 is connected to the output of HRNG 102 in order to receive and temporarily store the HRNG output bit stream for a later fetching by processor 104. Accordingly, processor 104 is able to fetch the content of register 106. For example, processor 104 executes a program 110 residing in memory 108 with which processor 104 is coupled.

As described above with respect to FIG. 3f, the HRNG 102 operates in order to intermittently refill register 106 by a truly random bit stream. The intervals at which register 106 is refilled depends on the pseudo random bit stream of PRNG 104. The bit stream output by HRNG 102 by which register 106 is refilled, is a true subset of an internally generated random signal obtained from a physical noise source. The processor 104 may be informed by register 106 each time that register 106 is completely refilled. From these times on processor 104 may fetch the temporarily stored data from register 106 such as, for example, upon receiving a respective instruction from memory 108. In case processor 104 receives an instruction to fetch a new random word from register 106 at a time register 106 has not yet been refilled since the last fetching of random data from register 106, the processor 104 may postpone the processing of this instruction until the register's content is updated by the HRNG 102. Alternatively, processor 104 may instruct the HRNG 102 to update the register's content upon the reception of a respective command to fetch random data from register 106 at a time the register's content has not yet been updated since the last fetching action, with actually performing the fetching action upon the update of the content of register 106.

The crypto controller of FIG. 8 may be implemented on a single chip or in a multi-chip module. The processor 104 could be configured to execute computer programs such as it has been described before. However, the processor 104 could also be a hard wired circuit. The register 106 could be implemented as a plurality of latches.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents to fall within the true spirit and scope of the present invention.

The invention claimed is:

1. A hybrid random number generator comprising:
an output;
a combinational logic;
a true random number generator;
a pseudo random number generator; and
an interconnection circuitry comprising
a selection circuit comprising selection circuit inputs and controllable to connect one of the selection circuit inputs to the output of the hybrid random number generator;
a first switch connected between an output of the true random number generator and an input of the pseudo random number generator via which an internal state of the pseudo random number generator is influencable; and
a second switch connected between an output of the pseudo random number generator and a first one of the selection circuit inputs,
wherein the hybrid random number generator is configurable to operate in a first and a second mode via the interconnection circuitry, wherein in the first mode the first switch is closed, the second switch is closed and the selection circuit is controlled so as to select the first one of the selection circuit inputs so that the pseudo random number generator is serially connected between the true random number generator and the output of the hybrid random number generator and the true random number generator intermittently influences the pseudo random number generator, and in the second mode the first switch is open, the second switch is open and the selection circuit is controlled so as to select a second one of the selection circuit inputs to which am output of the combinational logic is connected with inputs of the combinational logic being connected to the output of the true random number generator and the output of the pseudo random number generator, respectively, so that the true random number generator and the pseudo random number generator are connected to the output of the hybrid random number generator via the combinational logic.

2. The hybrid random number generator according to claim 1, wherein the true random number generator comprises a physical noise source.

3. The hybrid random number generator according to claim 2, wherein the true random number generator further comprises a compressor configured to increase a per-bit-entropy of a digitized bit sequence obtained from a physical noise source by way of performing a data compression onto the digitized bit sequence.

4. The hybrid random number generator according to claim 1, wherein in the first mode, a mean ration of (input data rate)/(output data rate) of the pseudo random number generator in a direction from the true random number generator to the output is smaller than one.

5. The hybrid random number generator according to claim 1, wherein in the first mode, the true random number generator intermittently seeds the pseudo random number generator.

6. The hybrid random number generator according to claim 1, wherein in the first mode, the output of the true random number generator is further connected to a decimation input of the pseudo random number generator via which a pseudo random number generator bit sequence at the output of the pseudo random number generator is decimatable.

7. The hybrid random number generator according to claim 6, wherein in the first mode, the true random number generator decimates the pseudo random number generator bit sequence such that the decimated pseudo random number generator bit sequence represents a proper subset of an internally generated pseudo random number generator bit sequence of the pseudo random number generator and the proper sub-set depends on a true random number generator bit sequence of the true random number generator.

8. The hybrid random number generator according to claim 1, wherein the combinational logic comprises a modulo-2 adder having a first input connectable to the true random number generator and a second input connectable to the pseudo random number generator.

9. The hybrid random number generator according to claim 1, wherein the interconnection circuitry further comprises a fourth switch connected between the output of the true random number generator and a third one of the selection circuit inputs and the hybrid random number generator is further configurable via the interconnection circuitry to operate in fourth mode in which the fourth switch is closed and the selection circuit is controlled so as to select the third one of the selection inputs so that the true random number generator is connected to the output of the hybrid random number generator with by-passing the pseudo random number generator.

10. The hybrid random number generator according to claim 6, wherein, in the first mode, the true random number generator intermittently influences the pseudo random number generator, a mean ration of (input data rate)/(output data rate) of the pseudo random number generator in a direction from the true random number generator to the output is smaller than one and the true random number generator intermittently seeds the pseudo random number generator.

11. The hybrid random number generator according to claim 1, wherein the interconnection circuitry further comprises a fourth switch connected between the output of the true random number generator and a third one of the selection circuit inputs and a fifth switch connected between the output of the pseudo random number generator and a decimation input of the true random number generator and the hybrid random number generator is further configurable via the interconnection circuitry to operate in a sixth mode in which the first switch is open, the second switch is open, the fourth switch is closed, the fifth switch is closed and the selection circuit is controlled so as to select the third one of the selection inputs so that the true random number generator is connected to the output of the hybrid random number generator and the pseudo random number generator decimates a true random number generator bit sequence of the true random number generator with the decimated true random number generator bit sequence being output at the output of the hybrid random number generator.

12. The hybrid random number generator according to claim 1, wherein the interconnection circuitry further comprises a third switch connected between the output of the true random number generator and the decimation input of the pseudo random number generator, and the hybrid random number generator is configurable to operate in the first, the second mode and a third mode via the interconnection circuitry, wherein in the first mode the third switch is closed, and, in the third mode, the first switch is closed, the second switch is closed, the third switch is open and the selection circuit is controlled so as to select the first one of the selection circuit inputs so that the pseudo random number generator is serially connected between the true random number generator and the output of the hybrid random number generator, the true random number generator intermittently influences the pseudo random number generator, and the pseudo random number generator bit sequence at the output of the pseudo random number generator is left un-decimated.

13. The hybrid random number generator according to claim 12, wherein in the first mode, the true random number generator decimates the pseudo random number generator bit sequence such that the decimated pseudo random number generator bit sequence represents a proper subset of an internally generated pseudo random number generator bit sequence of the pseudo random number generator and the proper sub-set depends on a true random number generator bit sequence of the true random number generator.

14. The hybrid random number generator according to claim 1, wherein the hybrid random number generator is further configurable via the interconnection circuitry to operate in a fifth mode in which the first switch is open, the second switch is closed and the selection circuit is controlled so as to select the first one of the selection circuit inputs so that the pseudo random number generator is connected to the output of the hybrid random number generator with the true random number generator being decoupled from the output.

* * * * *